March 18, 1924.  O. W. MOESLEIN  1,487,348
EGG SEPARATOR
Filed Dec. 5, 1922
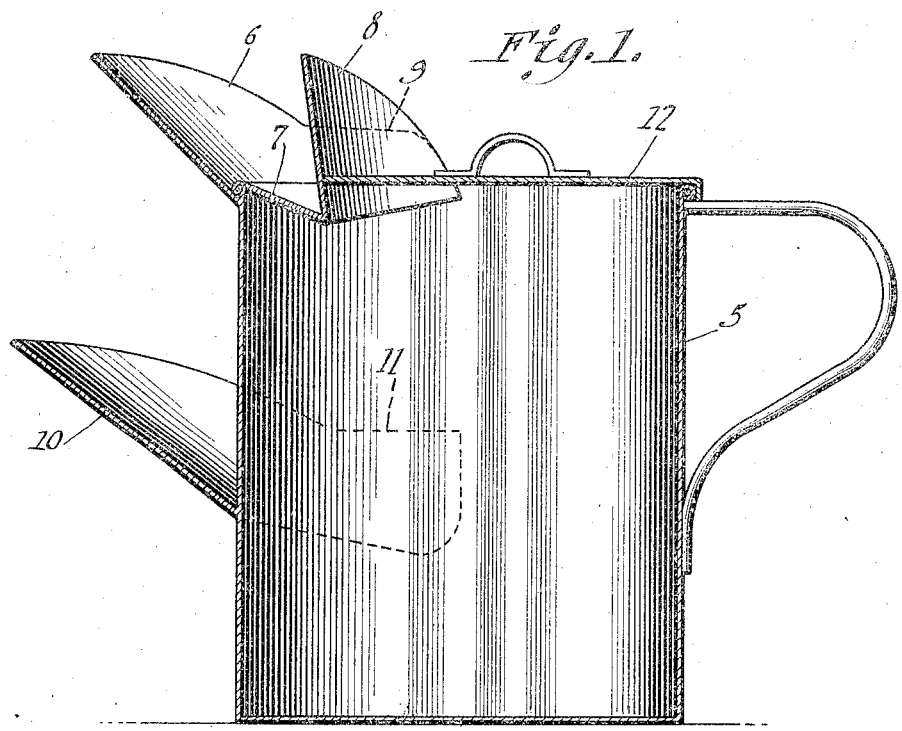
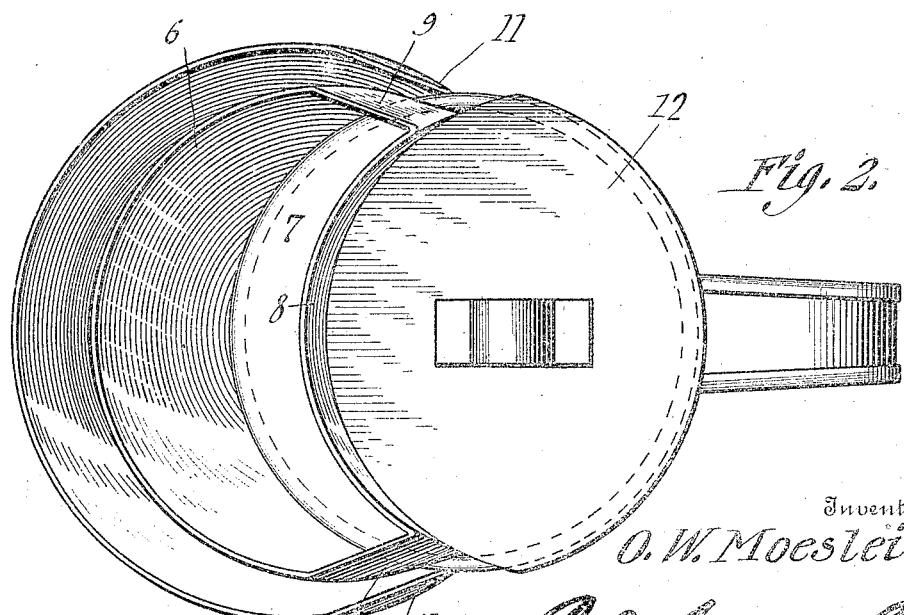
Inventor
O. W. Moeslein Patented Mar. 18, 1924.

1,487,348

UNITED STATES PATENT OFFICE.

OSCAR WILLIAM MOESLEIN, OF HARRISBURG, PENNSYLVANIA.

EGG SEPARATOR.

Application filed December 5, 1922. Serial No. 605,041.

*To all whom it may concern:*

Be it known that I, OSCAR W. MOESLEIN, a citizen of the United States, residing at Harrisburg, in the county of Dauphin and State of Pennsylvania, have invented a new and useful Egg Separator, of which the following is a specification.

By way of explanation, it might be stated that in bakeries where large quantities of eggs are used, it frequently happens that in breaking the eggs, the liquor from a musty or spoiled egg will pass into the container in which eggs have been broken, to the end that the perfect eggs are spoiled resulting in great loss to the person.

It is therefore the object of the present invention to protect the contents of the receptacle in which the eggs are broken, from the drippings of musty or eggs unfit for use, by providing a trough at the base of the lip of the receptacle to catch the drippings from the broken eggs.

A further object of the invention is to provide means for catching the drippings from the broken eggs which are perfect, thereby reducing the waste of the egg matter to a minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a vertical sectional view through a container constructed in accordance with the present invention.

Figure 2 is a plan view thereof.

Referring to the drawing in detail, the reference character 5 designates the body portion of the container which is formed with the usual lip 6, the outer edge thereof acting as a cutting edge on which eggs may be broken.

Extending inwardly at the base of the lip 6 is a flange 7 which has an integral upwardly extended lip 8 to provide a stop and prevent the egg matter from passing into the container.

Connecting the lips 6 and 8 at their ends are the curved walls 9 that prevent the egg matter from passing to the container at the ends of the lips. A lip indicated at 10 is secured to the front of the container at a point intermediate the ends thereof, the lip 10 having its outer end disposed in a plane beyond the outer edge of the lip 6, so that drippings, incident to the breaking of an egg on the lip 6, will fall onto the lip 10 and be held therein until the same may be emptied.

In order that the liquor may be held between the lip 10 and front wall of the container, end walls 11 are provided. In the use of the device, should a musty egg be broken over the lip 6, the drippings therefrom would pass between the lips 6 and 7, eliminating any possibility of the drippings passing into the container to spoil the contents thereof. A cover indicated at 12 is provided and may be positioned over the upper end of the container to close the same, and retain the contents of the container when the liquor from the musty egg is being poured from the lip 6.

What is claimed is:

In a device of the class described, a body portion, a lip formed at the upper end of the body portion, and extending outwardly therefrom, a flange extending downwardly and inwardly from the upper edge of the body portion at a point adjacent to the lip, an upwardly extended lip formed integral with the inner edge of the flange, the first mentioned lip having curved walls formed at its ends and being secured to the second mentioned lip, a lip secured to the outer surface of the body portion at a point intermediate its ends and directly below the first mentioned lip, the first mentioned lip extending to a point beyond the outer edge of the first mentioned lip and a cover adapted to rest on the upper edge of the body portion and engage the second mentioned lip to retain material in the body portion while the body portion is being tipped forwardly.

In testimony that I claim the foregoing as my own, I have hereto affixed my signature in the presence of two witnesses.

OSCAR WILLIAM MOESLEIN.

Witnesses:
P. B. MAING,
JOHN V. SULLIVAN.